(12) United States Patent
Chan et al.

(10) Patent No.: US 7,114,102 B2
(45) Date of Patent: Sep. 26, 2006

(54) MONITORING SYSTEM AND METHOD FOR MONITORING AND PROCESSING DATA TRANSMITTED BETWEEN A HOST AND A MANAGING SYSTEM

(75) Inventors: Sen-Ta Chan, Taipei Hsien (TW); Yi-Chang Wu, Taipei Hsien (TW); Yi-Hsun Chen, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 611 days.

(21) Appl. No.: 10/339,017

(22) Filed: Jan. 8, 2003

(65) Prior Publication Data
US 2004/0019834 A1    Jan. 29, 2004

(30) Foreign Application Priority Data
Jul. 24, 2002 (TW) ................. 91116468 A (51) Int. Cl.
*G06F 11/00* (2006.01)
(52) U.S. Cl. .............. 714/37; 714/43; 714/45; 714/46; 709/223
(58) Field of Classification Search .......... 714/43
See application file for complete search history.

(56) References Cited

U.S. PATENT DOCUMENTS 5,628,030 A * 5/1997 Tuckner ............ 710/64
6,173,340 B1 * 1/2001 Gready et al. ........... 710/6
6,243,838 B1 * 6/2001 Liu et al. .............. 714/57
6,769,077 B1 * 7/2004 Vachon et al. .......... 714/43

FOREIGN PATENT DOCUMENTS

CN       1160246       9/1997

* cited by examiner

Primary Examiner—Bryce Bonzo
Assistant Examiner—Matthew Urick
(74) Attorney, Agent, or Firm—Ladas & Parry LLP (57) ABSTRACT

A monitoring system includes a data input/output device, a processing device, a memory device and a transmission device. The data input/output device is coupled electrically to a host and a managing system for handling data transmission therebetween. The processing device is used to verify data that is transmitted to the data input/output device. The memory device is used to store the data verified by the processing device therein. The transmission device is adapted to establish a network connection with the managing system, and is operable so as to selectively route the data verified by the processing device to the network connection for reception by the managing system. A method for monitoring and processing screen data transmitted between a host and a managing system is also disclosed.

35 Claims, 6 Drawing Sheets

MONITORING SYSTEM AND METHOD FOR MONITORING AND PROCESSING DATA TRANSMITTED BETWEEN A HOST AND A MANAGING SYSTEM

CROSS-REFERENCE TO RELATED APPLICATION

This application claims priority of Taiwanese application no. 091116468, filed on Jul. 24, 2002.

BACKGROUND OF THE INVENTION

1. Field of the Invention

The invention relates to a monitoring system and method for monitoring and processing data transmitted between a host and a managing system, more particularly to a monitoring system and method for monitoring and processing screen data transmitted between a host and a managing system.

2. Description of the Related Art

Usually, when a computer crashes, the operating system will show an error status on a computer screen. The information shown generally includes contents of CPU registers, hardware error messages, etc. Thus, maintenance personnel or system administrators can analyze the error status to locate the source of the system crash.

As the whole computer system stops after the operating system shows the error status, it is not possible to record the error status by merely using software applications. Moreover, since servers and computer systems are currently provided with a function of automatic restarting after a system crash, the error status is undesirably lost when the system is restarted, thereby preventing the maintenance personnel or system administrators from locating the source of the system crash.

To solve the aforesaid problem, a remote diagnosis card has been proposed heretofore for plugging into a peripheral component interconnect (PCI) interface so as to record contents of CPU registers and hardware error messages when a server or computer system encounters a fatal error or crash. In use, the remote diagnosis card monitors signals present in the PCI bus, and records image signals present in the PCI bus. As such, when a server or computer system crashes, the last screen data can be stored or sent to a remote server or computer system for further analysis. However, the aforesaid remote diagnosis card suffers from the following drawbacks:

First, the remote diagnosis card must occupy a PCI slot in the computer system. Because servers and computer systems require connection with different peripheral devices, and because the allotted number of PCI slots is generally limited to a maximum of two, the presence of the remote diagnosis card will have an adverse effect on expansion of the functionality of the server or computer system. Furthermore, the remote diagnosis card must be located on the same PCI bus as the VGA integrated circuit chip used for image processing in the server or computer system. If the VGA integrated circuit chip is located on another PCI bus or on an accelerated graphic port (AGP) bus, the remote diagnosis card will not be able to work. Moreover, the cost of the remote diagnosis card is rather high. The remote diagnosis card is hence not suitable and may be unaffordable to many ordinary computer users.

Figure 1:
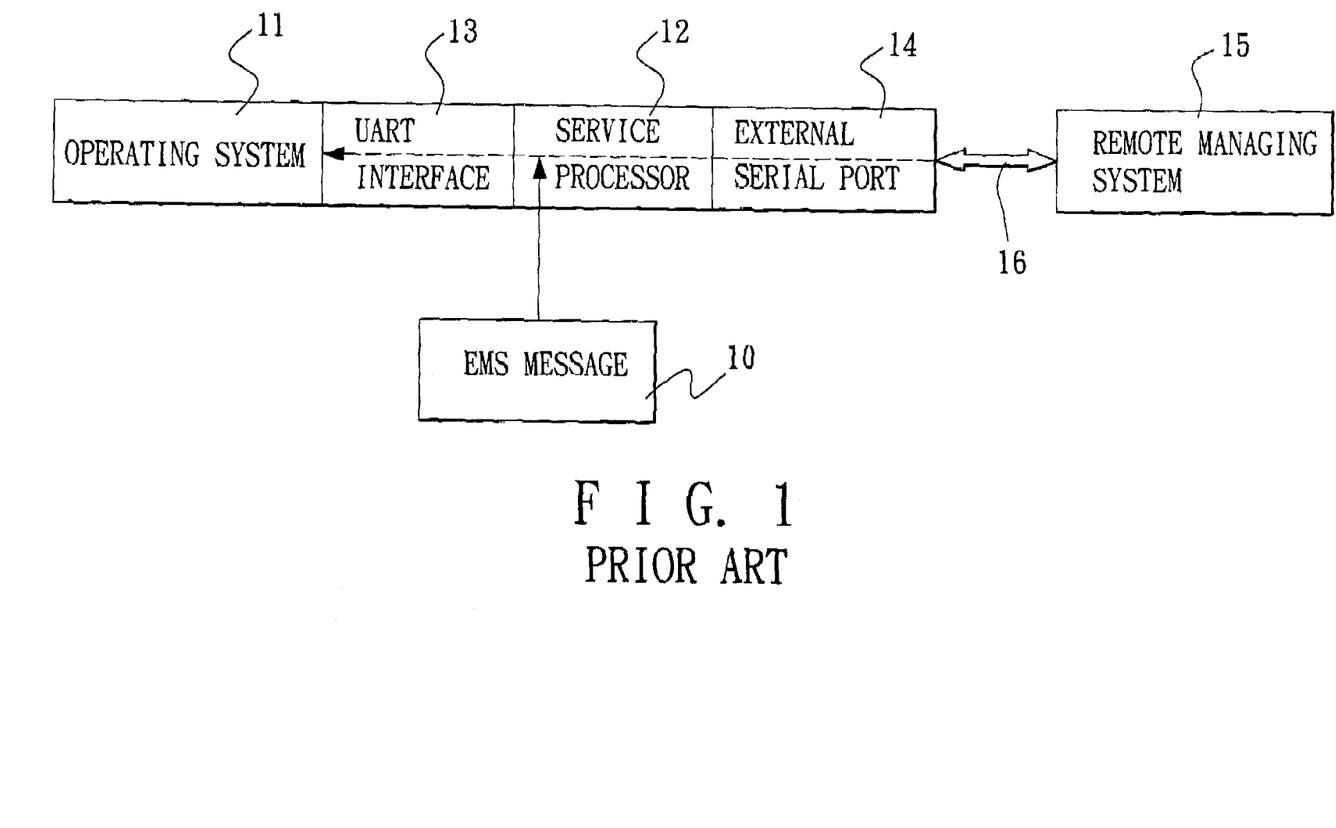
FIG. 1 is a schematic block diagram showing the framework of a conventional emergency management service.

Aside from installing a remote diagnosis card in a server or computer system, there is another known solution to the aforesaid problem. FIG. 1 illustrates the specification of an Emergency Management Service (EMS) 10 proposed by Microsoft. The specification requires the operating system 11 of a computer system to send out messages in case of an emergency so that information relevant to a system crash can be recorded. Under this framework, a service processor 12 is connected to a Universal Asynchronous Receiver/Transmitter (UART) interface 13 so that the operating system 11 can transmit error messages generated during system crash to the service processor 12 through the UART interface 13. Thereafter, the error message is further transmitted to a remote managing system 15 for analysis and processing through an external serial port 14 and a virtual modem 16 interconnecting the service processor 12 and the remote managing system 15.

Although the foregoing framework provides a way to store system crash screen data, there are still some drawbacks. First, to support the framework in accordance with the aforesaid EMS specification, an extra UART interface must be provided on the main board of a server or computer system. However, the UART interface is not a popular design in computer components. For example, widely used integrated service processors, such as Philip 87C652, Winbond 83910F, etc., are provided with serial ports, but not with UART interfaces. Therefore, if the aforesaid EMS specification is to be implemented on a server or computer system that does not incorporate a UART interface, the entire logic circuit must be redesigned, which is not only time-consuming, but is also costly. Moreover, the framework requires a virtual modem connected to a dedicated managing system, which incurs higher operating expenses.

There is thus a need to provide a monitoring system and method for effectively recording error messages generated during system crash without altering the design of existing servers or computer systems and without requiring the use of dedicated managing systems that would undesirably increase the operating costs.

SUMMARY OF THE INVENTION

Therefore, the object of the present invention is to provide a monitoring system and method for monitoring and processing data transmitted between a host and a managing system and capable of overcoming the above drawbacks associated with the prior art.

According to one aspect of the present invention, there is provided a monitoring system for monitoring and processing data transmitted between a host and a managing system. The monitoring system comprises:

a data input/output device adapted to be coupled electrically to the host and the managing system for handling data transmission therebetween;

a processing device, coupled electrically to the data input/output device, for verifying data that is transmitted to the data input/output device;

a memory device, coupled electrically to the processing device, for storing the data verified by the processing device therein; and a transmission device coupled electrically to the data input/output device, adapted to establish a network connection with the managing system, and operable so as to selectively route the data verified by the processing device to the network connection for reception by the managing system.

According to another aspect of the present invention, there is provided a method for monitoring and processing screen data transmitted between a host and a managing system. The method comprises the steps of:

(a) monitoring operations of the host and the managing system;

(b) verifying the screen data when the screen data is generated;

(c) recording the screen data verified in step (b) in a memory device; and (d) optionally routing the screen data verified in step (b) to the managing system through a network.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
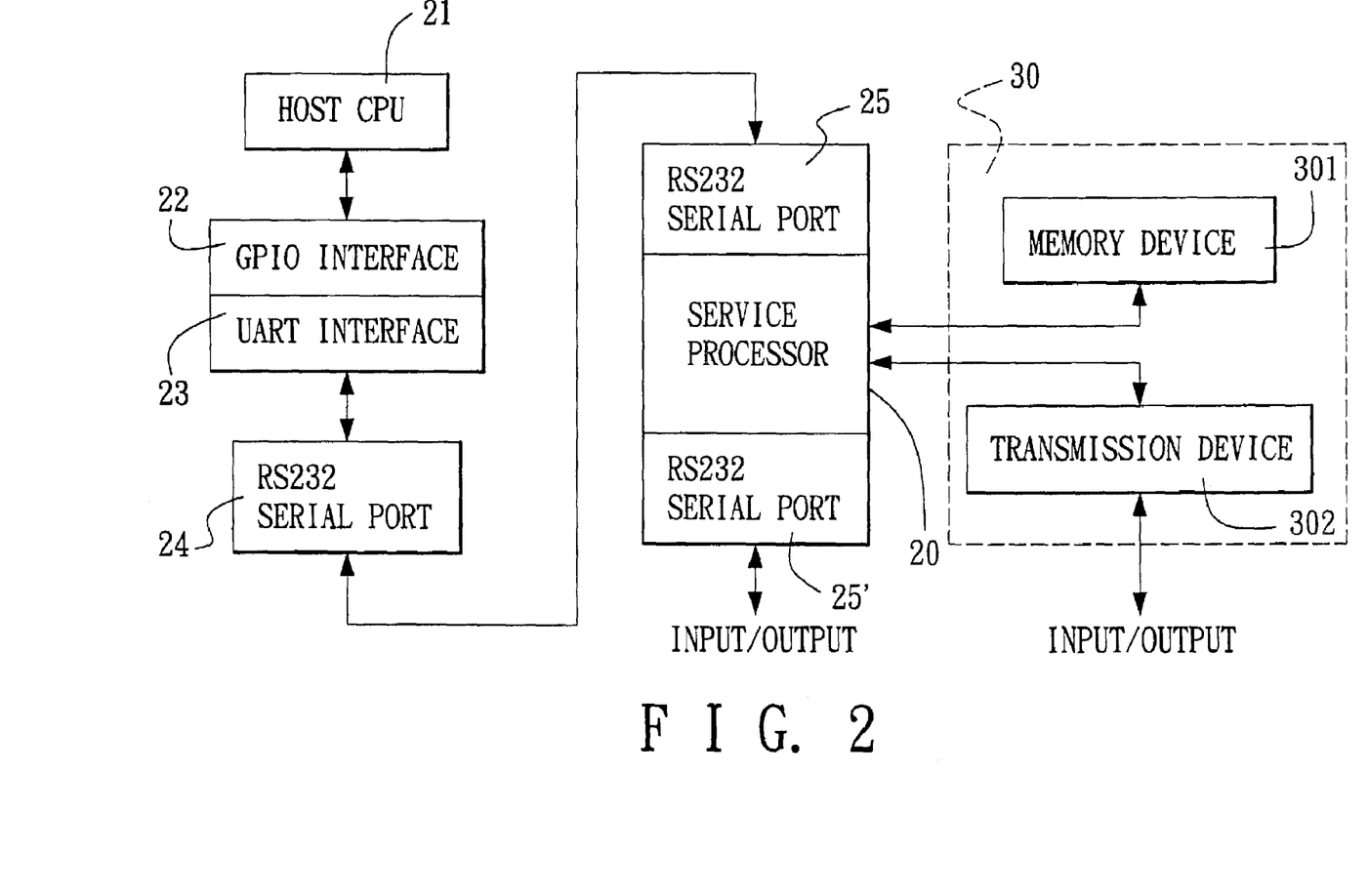
FIG. 2 is a schematic block diagram showing a system that incorporates the preferred embodiment of a monitoring system according to this invention.

Referring to FIG. 2, the preferred embodiment of a monitoring system 30 according to this invention enables recording of data (i.e., the aforesaid error messages) generated when a server or computer system (hereinafter referred to as a host) crashes without altering the original design of a service processor 20 therein. In the system of FIG. 2, the data is outputted by a central processing unit (CPU) 21 of the host, passes through a General Purpose Input and Output (GPIO) interface 21 on a south bridge chipset of the main board of the host, and through a UART interface 23 and a serial port 24. The serial port 24 is an RS232 interface. In actual practice, any interface adapted for data transmission can be used. From the serial port 24, the data then passes through a serial port 25 (e.g., an RS232 interface) of the service processor 20 in the host, and is outputted by the service processor 20 through another serial port 25' (e.g., an RS232 interface) so as to be received by a managing system (not shown) for subsequent data analysis, or is outputted in the alternative by the service processor 20 directly to the monitoring system 30 for storage in a memory device 301 to permit subsequent analysis and processing. Furthermore, the data can be outputted by the monitoring system 30 to a remote managing system (not shown) that can perform the relevant data analysis through a network connection established by a transmission device 302, e.g., a network chip, of the monitoring system 30.

Figure 3:
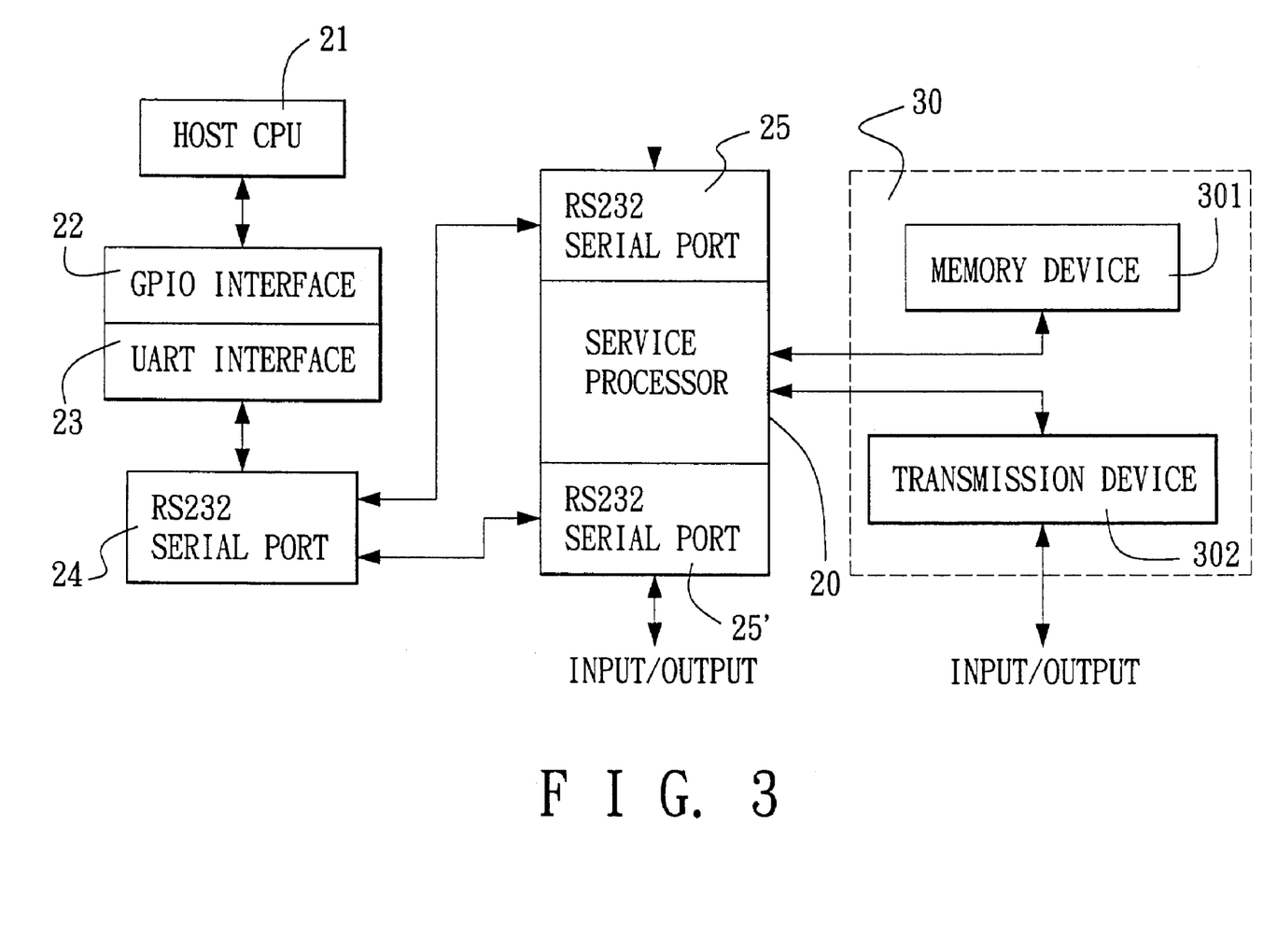
FIG. 3 is a schematic block diagram showing another system modified from the system of FIG. 2.

FIG. 3 illustrates another system that incorporates the monitoring system 30 and that is modified from the system of FIG. 2. Unlike the system of FIG. 2, the serial port 24 (i.e., the RS232 interface) of the host and the serial port 25' of the service processor 20 are further connected to each other, preferably by way of a virtual modem, such that there is no perceivable change in hardware design from the standpoint of the host. Therefore, when system crash error messages are transmitted to the UART interface 23, by virtue of the virtual modem connection, the service processor 20 will be able to receive the error messages.

As compared to the system of FIG. 2, when an error message reaches the serial port 24 in the system of FIG. 3, the message can be transmitted to the service processor 20 through either of the serial ports 25 or 25'. It should be emphasized herein that, in actual practice, the monitoring system of this invention is applicable to a computer system that does not incorporate a UART interface. As long as a data communications channel can be established between a GPIO interface and a serial port of the service processor, the purpose of processing screen data by a monitoring system according to this invention can be served as well.

Therefore, without major changes in the hardware configuration of the host, the monitoring system of this invention is able to record an error message (an error message often includes managing screen data, i.e., the so-called Blue Screen). Useful information, such as the time when the data is received, can also be recorded for later analysis, and the recorded number of managing screen data can vary according to the capacity of the memory device. Moreover, since data can be provided to the monitoring system 30 through a virtual modem connection, there is no need for each server or computer system to be connected to a dedicated managing system. Accordingly, a managing system can be connected to a plurality of hosts to record sets of managing screen data for analysis. Besides, the host can be connected to a managing system through a local area network or the Internet, which saves a lot of engineering construction work over physical network connections, and which makes analysis, processing, and maintenance easier, thereby resulting in labor and computer resource cost savings.

Figure 4:
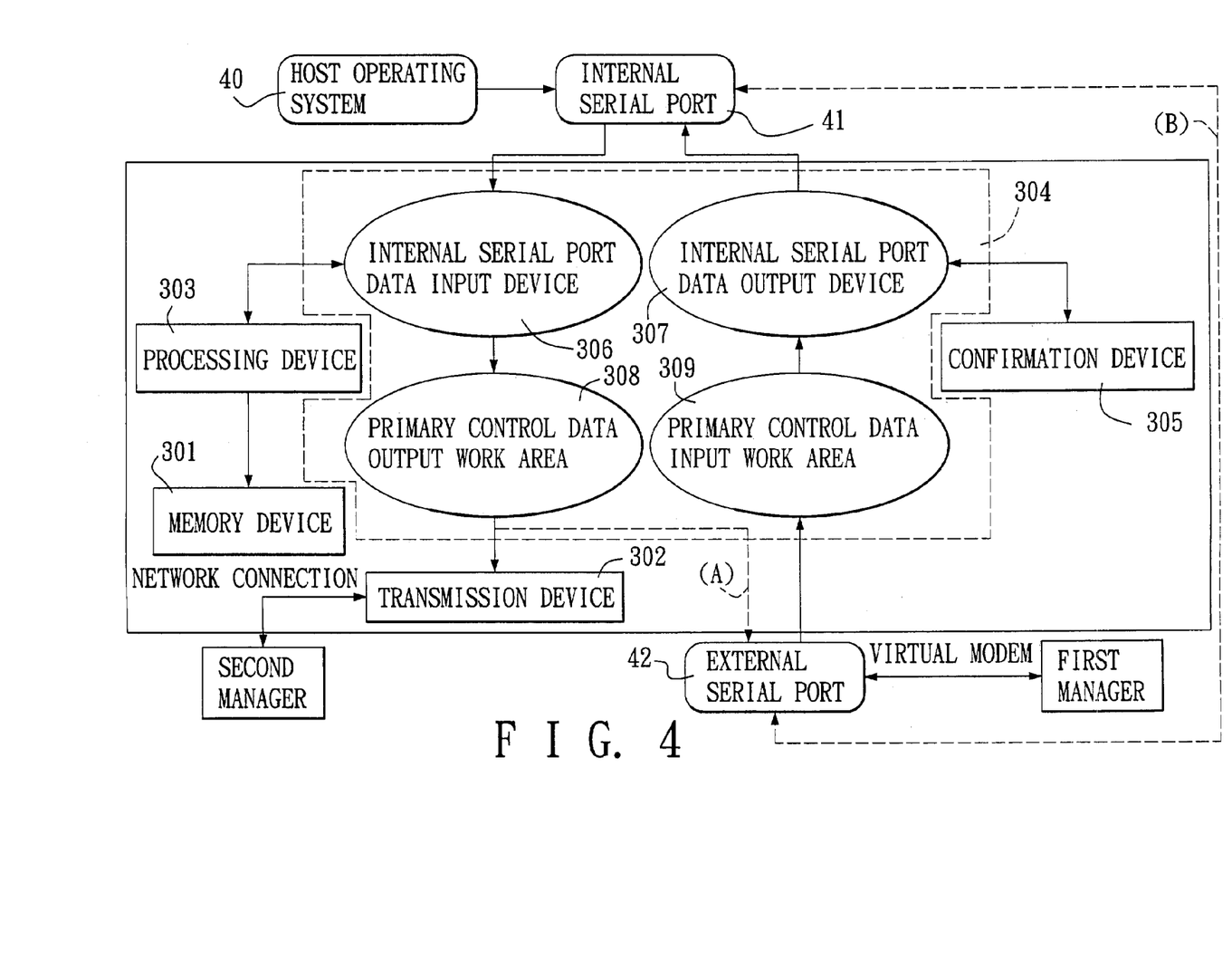
FIG. 4 is a schematic block diagram showing internal modules and devices present in the preferred embodiment of the monitoring system according to this invention.

Referring to FIG. 4, aside from the aforesaid memory device 301 and the transmission device 302, the monitoring system 30 of the preferred embodiment further includes a processing device 303 coupled electrically to the memory device 301, a data input/output device 304, coupled electrically to the processing device 303 and the transmission device 302 and adapted to be coupled electrically to the host and the managing system, and a confirmation device 305 coupled electrically to the data input/output device 304. When the host crashes, the operating system 40 of the host, preferably a Windows® operating system, more preferably, a Microsoft Windows® operating system with a version number higher than 95, will transmit the diagnosis or managing screen data associated with the system crash to the data input/output device 304 through an internal serial port 41. After the processing device 303 verifies that the data transmitted to the data input/output device 304 is an actual error message generated by the operating system 40 during system crash, the data will be stored in the memory device 301, which is a nonvolatile memory device. Alternatively, the data input/output device 304 can transmit the data verified by the processing device 303 to the transmission device 302. The transmission device 302, such as a known network chip, is adapted to establish a network connection with the managing system in a conventional manner, and is operable so as to selectively route the data verified by the processing device 303 to the network connection for reception by the managing system. The confirmation device 305 is operable so as to confirm an AT instruction set between the host and a first or second manager of the managing system, and predetermined commands from the managing system. The confirmation device 305 cooperates with the processing device 303 to read the AT instruction set and the predetermined commands from the managing system. For example, the confirmation device 305 can be used to confirm a power control instruction to control power supply of the host. In another example, the confirmation device 305 can be used to confirm an instruction to command the processing device 303 to retrieve the managing screen data stored in the memory device 301.

In FIG. 4, the dotted line (A) indicates a data route present in the system of FIG. 2, while the dotted line (B) indicates another data route present in the system of FIG. 3. As mentioned hereinabove, regardless of which system, i.e., the system of FIG. 2 or FIG. 3, is in use, the purpose of capturing managing screen data, i.e., the "Blue Screen" display data, during system crash can be served. Furthermore, the monitoring system 30 of this invention also supports the emergency management service (EMS) used by the host. Aside from providing network functionality to the EMS specification, in the case that a network connection is absent, a data transmission route through a serial port, i.e., the route indicated by the dotted line (B), is available such that the workload of the service processor can be reduced in the sense that the service processor is only responsible for data monitoring and is not responsible for data transfer through the serial port.

As mentioned hereinabove, the memory device 301 is preferably a nonvolatile memory device for storing the managing screen data. Depending on the type of the nonvolatile memory device, different interfaces can be used. For example, an interface design of an inter-integrated circuit bus, such as a multi-master 2-wire serial bus (I2C), is recommended. As for the interface design for the network chip of the transmission device 302, it can be configured for sharing with the network port of the host operating system. Physically, this invention utilizes the reserved system management bus in the network chip for network communications in practice.

Preferably, the data input/output device 304 includes a first input/output control module adapted for controlling communication between the internal serial port 41 and the host operating system 40, and a second input/output control module adapted for controlling communication among the external serial port 42, the network chip 302, and first and second managers of the managing system. As shown in FIG. 4, the first input/output control module includes an internal serial port data input device 306 and an internal serial port data output device 307. The second input/output control module includes a primary control data output work area 308 and a primary control data input work area 309.

Figure 5:
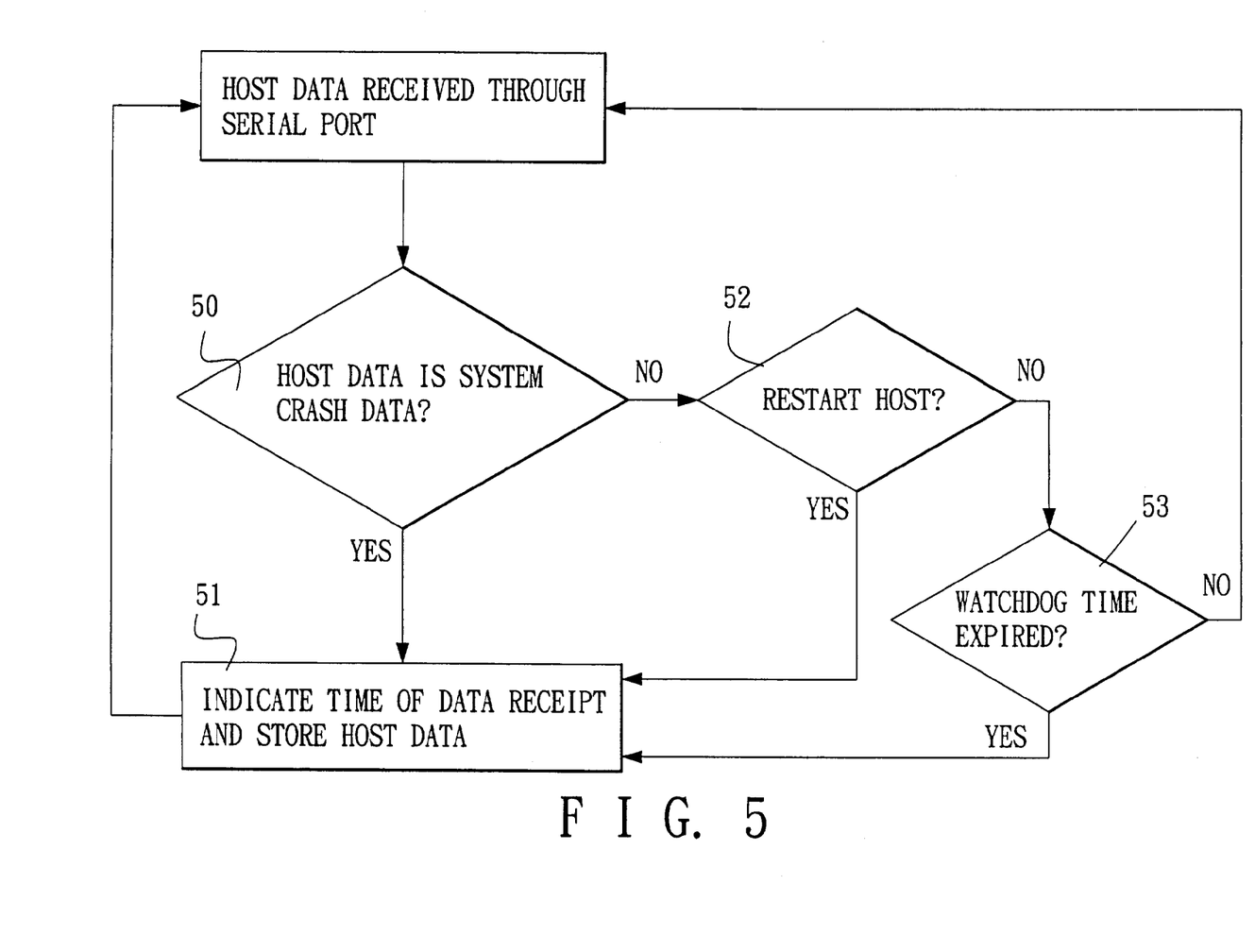
FIG. 5 is a flowchart showing how managing screen data generated when a computer system crashes is processed according to this invention.

Referring to FIG. 5, in use, when the monitoring system 30 of this invention receives data from the host through the RS232 serial port, the data will be verified by the processing device 303 at step 50 to determine whether the data is managing screen data associated with system crash. In the negative, the flow goes to step 52. Otherwise, the flow goes to step 51. In step 51, the time of receipt of the managing screen data will be indicated, and the managing screen data will be stored in the memory device 301. In step 52, it is determined whether the host is to be restarted. In the affirmative, the flow goes to step 51. Otherwise, the flow goes to step 53. In step 53, a watchdog timer is used to determine whether a preset watchdog time has expired. In the affirmative, the flow goes to step 51.

Figure 6:
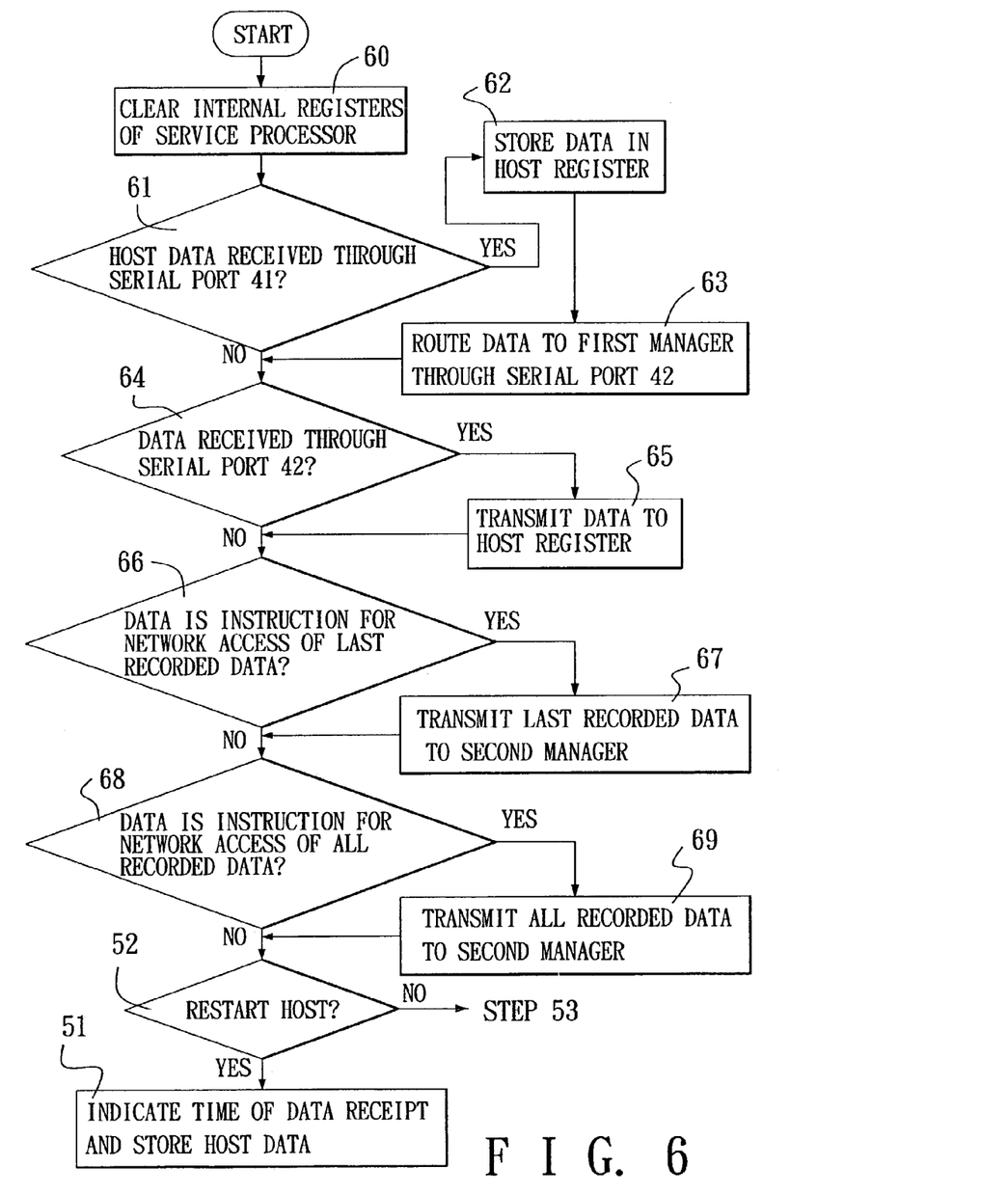
FIG. 6 is a flowchart showing the processing steps in the flowchart of FIG. 5 in greater detail.

FIG. 6 illustrates the operation of the monitoring system 30 of this invention in greater detail. With additional reference to FIG. 4, initially, in step 60, the internal registers of the service processor 20 (see FIGS. 2 and 3) are cleared. Thereafter, in step 61, it is determined if data is received from the host through the internal serial port 41. In the negative, the flow goes to step 64. In the affirmative, the data will be stored in a host register in step 62, and the data will be routed to the first manager of the managing system through the external serial port 42, i.e., the transmission route indicated by the dotted line (B), in step 63. Subsequently, in step 64, the monitoring system 30 will determine whether data is received from the external serial port 42 (and hence, from the first manager of the managing system). In the affirmative, the flow goes to step 65, where the data is transmitted to the host register through the primary control data input work area 309, the internal serial port data output device 307, and the internal serial port 41. In the negative, the flow goes directly to step 66. In step 66, the monitoring system 30 will determine whether the data is received from the second manager of the managing system through the network connection and indicates an instruction for accessing last recorded data. In the affirmative, the flow goes to step 67, where the last recorded data will be transmitted to the second manager of the managing system through the internal serial port data input device 306, the primary control data output work area 308, and the network connection. Otherwise, the flow goes directly to step 68. In step 68, the monitoring system 30 will determine whether the data is received from the second manager of the managing system through the network connection and indicates an instruction for accessing all recorded data. In the affirmative, the flow goes to step 69, where all recorded data will be transmitted to the second manager of the managing system through the internal serial port data input device 306, the primary control data output work area 308, and the network connection. Otherwise, the flow goes directly to step 52 of FIG. 5.

In practice, the monitoring system 30 of this invention may be established inside a computer system and may be implemented through written program codes that are to be executed by the computer system and through interface connection of serial and network ports. Alternatively, the monitoring system 30 of this invention may be implemented as an application specific integrated circuit chip to be mounted on a main board of a computing system. Likewise, the integrated circuit chip will be configured with data input/output means for handling data transmission between a host computer and a managing system, processing means for enabling the host computer to verify data that is transmitted to the data input/output device, memory means for enabling the host computer to store the data that was verified therein, and transmission means for enabling the host computer to establish a network connection with the managing system so as to selectively route the data that was verified to the network connection for reception by the managing system. Preferably, the integrated circuit chip is connected to an interface of a south-bridge chipset for efficient connection with internal or external serial ports of the computer system.

In summary, the monitoring system and method provided by this invention can offer a plurality of alternative transmission routes for monitoring and processing data transmitted between a host computer and a managing system without overhauling the original layout of the host computer. Accordingly, the object of this invention is thereby achieved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A monitoring system for monitoring and processing data transmitted between a host and a managing system, said monitoring system comprising:
   a data input/output device adapted to be coupled electrically to the host and the managing system for handling data transmission therebetween;
   a processing device, coupled electrically to said data input/output device, for verifying data that is transmitted to said data input/output device;
   a memory device, coupled electrically to said processing device, for storing the data verified by said processing device therein; and
   a transmission device coupled electrically to said data input/output device, adapted to establish a network connection with the managing system, and operable so as to selectively route the data verified by said processing device to the network connection for reception by the managing system.

2. The monitoring system as claimed in claim 1, wherein said data input/output device is adapted to communicate with the host through an internal serial port.

3. The monitoring system as claimed in claim 2, wherein said data input/output device includes an input/output control module adapted for controlling data transmission through the internal serial port.

4. The monitoring system as claimed in claim 1, wherein said data input/output device is adapted to communicate with the managing system through an external serial port.

5. The monitoring system as claimed in claim 4, wherein said data input/output device is adapted to communicate with the managing system through a virtual modem that is connected to the external serial port.

6. The monitoring system as claimed in claim 4, wherein said transmission device includes a network chip.

7. The monitoring system as claimed in claim 6, wherein said data input/output device includes an input/output control module adapted for controlling data transmission among the external serial port, said network chip and the managing system.

8. The monitoring system as claimed in claim 6, wherein said data input/output device is adapted to communicate with a first manager of the managing system through the external serial port, and said network chip is adapted to communicate with a second manager of the managing system.

9. The monitoring system as claimed in claim 1, wherein said data input/output device is adapted to communicate with the managing system through an RS232 serial port.

10. The monitoring system as claimed in claim 1, further comprising a confirmation device coupled electrically to said data input/output device and operable so as to confirm an AT instruction set between the host and the managing system and predetermined commands from the managing system.

11. The monitoring system as claimed in claim 10, wherein said confirmation device cooperates with said processing device to read the AT instruction set and the predetermined commands from the managing system.

12. The monitoring system as claimed in claim 1, wherein said memory device is a nonvolatile memory device.

13. The monitoring system as claimed in claim 1, wherein the data verified by said processing device is managing screen data.

14. The monitoring system as claimed in claim 13, wherein the managing screen data is a record of host system crash data.

15. The monitoring system as claimed in claim 1, wherein said monitoring system is implemented as a computing system.

16. A method for monitoring and processing screen data transmitted between a host and a managing system, comprising the steps of:
   (a) monitoring operations of the host and the managing system;
   (b) verifying the screen data when the screen data is generated;
   (c) recording the screen data verified in step (b) in a memory device; and
   (d) optionally routing the screen data verified in step (b) to the managing system through a network.

17. The method as claimed in claim 16, wherein step (b) includes a sub-step of determining whether the screen data was transmitted from the host or the managing system.

18. The method as claimed in claim 16, wherein the screen data is transmitted to one of the host and the managing system through a serial port.

19. The method as claimed in claim 16, wherein the time of receipt of the screen data is further indicated in step (c).

20. The method as claimed in claim 16, wherein the screen data is transmitted between the host and the managing system through an input/output device.

21. The method as claimed in claim 16, wherein the screen data is transmitted from the host through a serial port.

22. An integrated circuit chip adapted to be mounted on a main board of a host computer for monitoring and processing-data transmitted between the host computer and a managing system, said integrated circuit chip comprising:
   data input/output means for handling data transmission between the host computer and the managing system;
   processing means for enabling the host computer to verify data that is transmitted to said data input/output device;
   memory means for enabling the host computer to store the data that was verified therein; and
   transmission means for enabling the host computer to establish a network connection with the managing system so as to selectively route the data that was verified to the network connection for reception by the managing system.

23. The integrated circuit chip as claimed in claim 22, wherein said data input/output means is adapted to be connected electrically to an internal serial port of the host computer.

24. The integrated circuit chip as claimed in claim 23, wherein said data input/output means includes an input/output control module adapted for controlling data transmission through the internal serial port.

25. The integrated circuit chip as claimed in claim 22, wherein said data input/output means is adapted to be connected electrically to the managing system through an external serial port.

26. The integrated circuit chip as claimed in claim 25, wherein said data input/output means is adapted to be connected to the managing system through a virtual modem that is connected to the external serial port.

27. The integrated circuit chip as claimed in claim 25, wherein said transmission means includes a network circuit.

28. The integrated circuit chip as claimed in claim 27, wherein said data input/output means includes an input/output control module adapted for controlling data transmission among the external serial port, said network circuit and the managing system.

29. The integrated circuit chip as claimed in claim 27, wherein said data input/output means is adapted to communicate with a first manager of the managing system through the external serial port, and said network circuit is adapted to communicate with a second manager of the managing system.

30. The integrated circuit chip as claimed in claim 22, wherein said data input/output means is adapted to communicate with the managing system through an RS232 serial port.

31. The integrated circuit chip as claimed in claim 22, further comprising confirmation means for confirming an AT instruction set between the host computer and the managing system and predetermined commands from the managing system.

32. The integrated circuit chip as claimed in claim 31, wherein said confirmation means cooperates with said processing means to read the AT instruction set and the predetermined commands from the managing system.

33. The integrated circuit chip as claimed in claim 22, wherein said memory means includes nonvolatile memory.

34. The integrated circuit chip as claimed in claim 22, wherein the data verified through said processing means is managing screen data.

35. The integrated circuit chip as claimed in claim 34, wherein the managing screen data is a record of host computer crash data.

* * * * *